Sept. 24, 1968     I. WIEDER     3,403,349
OPTICALLY PUMPED MASER AND SOLID STATE LIGHT
SOURCE FOR USE THEREIN
Original Filed May 28, 1959     2 Sheets-Sheet 1

WITNESSES:
Bernard R. Gieguey
James F. Young

INVENTOR
Irwin Wieder
BY Maury I. Hull
ATTORNEY

United States Patent Office 3,403,349
Patented Sept. 24, 1968

3,403,349
OPTICALLY PUMPED MASER AND SOLID STATE
LIGHT SOURCE FOR USE THEREIN
Irwin Wieder, Palo Alto, Calif., assignor to Westinghouse
Electric Corporation, Pittsburgh, Pa., a corporation of
Pennsylvania
Continuation of application Ser. No. 220,938, Aug. 27,
1962, which is a continuation of application Ser. No.
816,582, May 28, 1959. This application July 28, 1966,
Ser. No. 569,559
15 Claims. (Cl. 330—4.3)

This invention relates to improvements in solid state masers and optical pumping apparatus for use therein, and more particularly to an improved maser with a solid state light source especially suitable for producing optical absorption in an element of active material to thereby produce state preparation necessary for amplification by stimulated emission of radiation.

This application is a continuation of my prior application Ser. No. 220,938 filed Aug. 27, 1962 which in turn is a continuation of application S.N. 816,582, filed May 28, 1959.

Prior art masers employing optical pumping are characterized by a number of disadvantages. Such devices usually employ gases in which the gain-bandwidth product is very limited. The upper limit on the number of optically oriented spins in a gaseous system using known techniques is about $10^{12}$ cm.$^3$. Since the gain-bandwidth product of a maser is roughly proportional to the number of oriented spins, this upper limit is a severe restriction on the utilization of optically pumped gaseous amplifiers. Another way of stating the disadvantage is that optical pumped masers of the prior art are severely limited by considerations of low atomic or molecular density, hereinafter referred to as particle density. Particle densities in prior art optically pumped masers have been limited to desities in the order of $10^{12}$ cm.$^3$ primarily because of two effects. One of these effects is self-absorption. This is absorption of the randomly polarized radiation of pumped atoms, and atoms absorbing this radiation are not preferentially pumped, that is, the electrons do not assume any of the states which are useful for amplification of electromagnetic wave energy by stimulated emission of radiation. The other effect limiting particle density in conventional prior art optically pumped masers is coherence in spontaneous emission. As is known in the art, there is a tendency for closely coupled systems to radiate coherently. This means that above a certain density particles in the excited states radiate in phase with the incoming radiation, and the atoms return to their original sublevels in the ground state. Thus, above a density of about $10^{12}/$cm.$^3$, there would be little net pumping action.

In the apparatus of the instant invention, self-absorption effects are reduced by utilizing optical transitions with smaller excitation cross sections as may be found in solids. Coherence effects are eliminated because a material is employed in which the spin-lattice relaxation time in the excited state is considerably shorter than the optical lifetime, which may be in the order of approximately $10^{-3}$ seconds.

In a previously copending application Ser. No. 826,041 filed July 9, 1959, in the name of Irwin Wieder and John G. Castle, Jr., for "Solid State Maser Employing Modified Optical Pumping," assigned to the assignee of this application and now abandoned, there is described a system having a dominant feature in common with the present application, namely, a stimulated emission of radiation apparatus in which a portion of the downward transitions of the pumping cycle are radiationless. In that application, a body of solid state negative temperature material is positioned inside a specularly reflective cavity and is pumped by broad spectrum optical energy. The reflecting cavity serves to enhance the coupling between the excited electrons, or ions, and the resonant radiation.

That application discloses specific materials and the broad category of materials which includes the preferred material of this application. Although that application graphically illustrates an energy diagram for some materials for microwave operation, that specification states that the invention is not so limited and further teaches that the active material may be placed in the center of the cavity and light waves to be amplified may be beamed through the active material.

The apparatus of the instant invention overcomes the disadvantages of the prior art by employing optical pumping to produce state preparation in a solid material. In summary, the apparatus of the instant invention employs two samples of an active material which may be at low temperatures and which may be separated by a light polarizing element, one of these samples being located in a resonant cavity to which electromagnetic wave energy to be amplified is supplied, and the other of the elements of active material has a strong source of broad-spectrum light, which may be white light, applied thereto. The active material is chosen from a substance which exhibits photoluminescence and has a strong broad absorption band and sharp intense emission-absorption lines at somewhat longer wavelengths. In the first sample to which the broad spectrum light is applied, centers or electrons as a result of optical absorption are transferred from ground state level or sublevels to excited energy states; the excited electrons or centers decay by radiationless transition to a relatively long-lived luminescence state and thence to the ground state. Radiation from the first sample during the optical decay from the luminescent state to the ground state impinges on the second sample providing a light source for optical absorption by the second sample, and providing optical pumping for the second sample, which, as aforementioned is located in the electromagnetic wave cavity. Electrons in the second sample which are raised from ground state sub-levels to excited energy levels by the absorbed optical radiation from the first sample thereafter return to ground state sublevels in a non-equilibrium distribution and some electrons move from one upper ground state sublevel to a lower ground state sublevel and thereby give up their energy to an electromagnetic wave of predetermined suitable frequency, thereby amplifying the electromagnetic wave energy in the cavity. Means may be provided for subjecting the first and/or second samples to a steady state magnetic field of predetermined direction and magnitude, and means may be provided for maintaining the samples at low temperatures.

Accordingly, a primary object of the instant invention is to provide a new and improved solid state light source.

Another object is to provide a new and improved solid state light source especially suitable for optical pumping in solid state masers.

A further object is to provide a new and improved stimulated emission amplifier.

Other objects and advantages will become apparent after a study of the following specification when read in connection with the accompanying drawings, in which.

Figure 1:
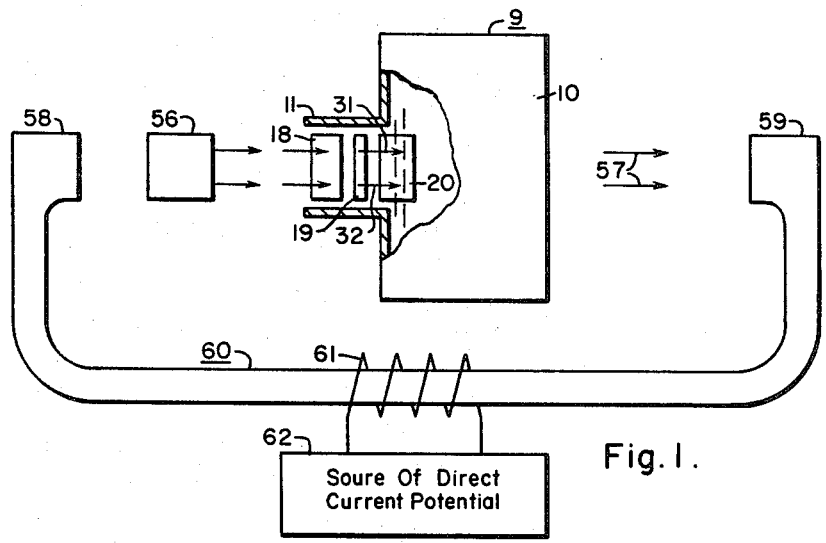
FIG. 1 is a generalized diagram of apparatus according to the invention.

Referring now to the drawings for a more detailed understanding of the invention, and in particular to FIG. 1 thereof, there is shown at 9 means forming a cavity 10 for electromagnetic wave energy to be amplified. The cavity forming means 9 has a stub portion 11 in which are mounted an element 18 of active material and a light polarizing and filter element 19. Disposed adjacent the element 19 inside of the cavity 10 is a second element 20 of active material which is so located in the cavity 10 that the electromagnetic field of the energy in the cavity is applied thereto and light passing through the light polarizing element and filter 19 impinges upon the element 20.

Elements 18 and 20 are composed of the same material, for example, ruby or emerald, although other materials are suitable, the other suitable materials including the transition elements, rare earths, and organic molecules and compounds of uranium and transuranic elements as impurities in various host lattices or as crystal compounds. One especially suitable material is the chromium positive ion in a host lattice of $Al_2O_3$ (ruby). It is essential that the material employed at 18 and 20 be photoluminescent and that, where microwaves are to be amplified, the identity of the magnetic sublevels in both the excited and ground states be maintained. If paramagnetic material, other than ruby, is employed it should exhibit paramagnetic resonance at ground state.

Figure 2A:
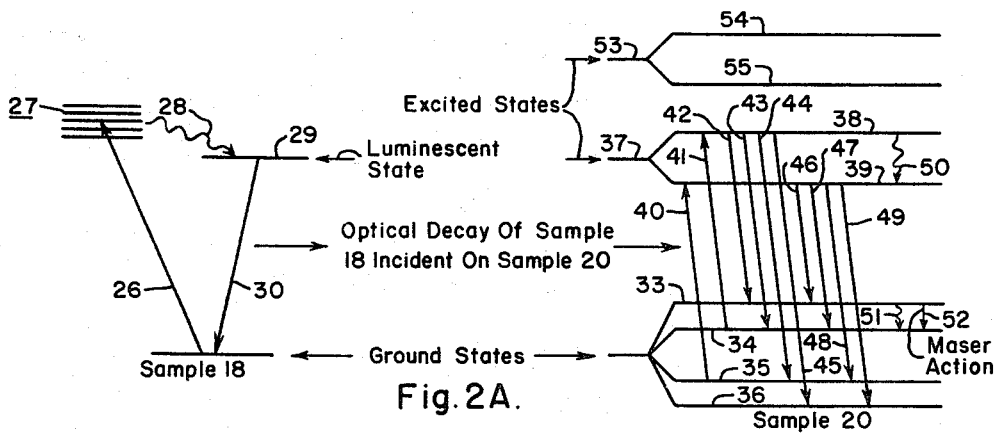
FIGS. 2A and 2B are graphs illustrating the operation of the apparatus of FIG. 1.
Figure 2B:
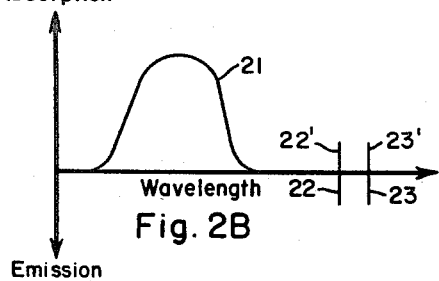

Particular reference should be made now to FIG. 2B which shows absorption and emission characteristics of the active material used as a function of wavelength. In FIG. 2B the horizontal coordinate represents wave length and absorption and emission are plotted as functions of wavelength, absorption being measured along the vertical coordinate in one direction while emission is measured in the other direction below the horizontal coordinate. It will be seen from a study of FIG. 2B that the material 18 and 20 can absorb radiation, that is, can undergo optical absorption over a wide band in a relatively large amount as represented by the curve 21, and also at somewhat longer wavelengths has narrow absorption bands 22' and 23'. Material 18 and 20 while in a luminescent state also emits energy in narrow bands or sharp lines of emission or radiation, these being shown at 22 and 23. It will be noted that the lines 22 and 23 extend below the horizontal coordinate of the graph in FIG. 2B. It should be understood, of course, that the material would also absorb light energy at the same frequencies as illustrated by lines 22' and 23' extending above the horizontal coordinate, if light energy of this frequency were applied to the material.

In the operation of the above-described apparatus of FIG. 1, a magnetic field 57 may be applied to the active material 18 and 20 depending upon the material employed and the frequency of the electromagnetic wave energy which it is desired to amplify. To this end, there is provided a magnet generally designated 60 having magnet pole pieces 58 and 59, and having a coil 61 connected to a suitable source of energizing potential 62 for setting up a magnetic field of predetermined direction and magnitude, the lines of force of the magnetic field being indicated at 57.

Wide spectrum or white light from the light source 56 impinges upon the first element of active material 18. In FIG. 2A, electrons as a result of optical absorption are transported from the ground state in the sample or element 18 by a path represented at 26 to a broad band excited state generally designated by the reference numeral 27, and thence the electrons move by radiationless decay indicated by path 28 to a luminescent state indicated at 29. Absorption in the sample 18 may take place over the entire wave length band represented by curve 21 of FIG. 2B. Optical decay occurs as the electrons move by path 30 from the luminescent state 29 to the ground state, and radiation at longer wavelengths and in lines indicated at 22 and 23 is emitted. This emitted optical radiation having wavelengths corresponding to the positions of lines 22 and 23 passes through the light polarizing element and filter 19 and thereafter by a path represented by arrows 31 and 32 impinges upon the second element of active material 20, these arrows 31 and 32 representing the passage of polarized monochromatic light. The function of the filter, if employed, is to remove background light. As previously stated, the active material 18 and 20 can also absorb radiation at the wavelengths represented by lines 22' and 23', and this radiation striking the second sample of active material 20 is absorbed by the second sample 20. Referring now to FIG. 2A, the sample 20 is shown to have several ground state sublevels indicated by the lines 33, 34, 35 and 36 separated from each other by discrete distances or amounts. As a result of optical absorption electrons move by several paths from the ground state sublevels to excited energy levels of state 37 represented by lines 38 and 39. Two of these paths are indicated by arrows 40 and 41. Some relaxation takes place between levels 38 and 39 as indicated by path 50. From excited energy levels 38 and 39 the electrons move by paths represented by arrows 42, 43, 44, 45, 46, 47, 48 and 49 to the ground state sublevels leaving a net non-equilibrium distribution. Electrons thereafter move by a radiative transition from the upper ground state sublevel 33 to the lower ground state sublevel 34 by a path represented by arrow 52 and amplification of the electromagnetic wave energy in the cavity 10 by stimulated emission results from electrons moving in the path of arrow 52. Some relaxation also takes place between ground state sublevels 33 and 34 as indicated by path 51. As is well known in the maser art, certain definite relationships exist between the characteristics of the active material, the frequency of the electromagnetic wave energy to be amplified and the strength of the applied magnetic field if one is employed, and it is assumed for purposes of description that electromagnetic wave energy of the proper frequency is applied to the cavity 10 to be amplified therein.

During optical absorption in sample 20, sublevels 34 and 35 are depopulated at different rates, the lower sublevel being depopulated at the greater rate. Electrons may return from excited energy levels to ground state sublevels at rates which tend to establish and maintain an excess population in at least one upper ground state sublevel; electrons in moving by a radiative transition from this last named sublevel to a lower ground state sublevel provide the maser action of the apparatus.

FIG. 2A has been simplified in several ways to facilitate clarity of the description of the operation of the apparatus.

Whereas only two paths 40 and 41 from two ground state sublevels 35 and 34 have been shown indicating optical absorption induced transitions to energy levels of the excited state 37, it should be understood that electrons are normally transferred from all the ground state sublevels during optical absorption at rates determined by selection rules and the polarization of the incident light.

Whereas maser action has been shown and described only with respect to movement of electrons along path 52 from sublevel 33 to sublevel 34, it should be understood that maser action could be obtained as a result of electrons moving from this sublevel to some other lower sublevel, or from some other sublevel to any lower sublevel, the frequencies at which electromagnetic wave energy would be amplified being different in the several cases.

The excited state 37 is populated, for example, by absorption of light energy in line 22' by sample 20. A second excited state 53 simultaneously is populated by absorption of light energy from sample 18 in line 23' by sample 20, excited state 53 having energy levels 54 and 55. It will be understood that FIG. 2A, if complete in every detail, would show in addition eight paths from ground state sublevels 33, 34, 35 and 36 to excited energy levels 54 and 55, and eight return paths from levels 54 and 55 to the four ground state sublevels.

FIG. 2A, as now drawn, in which preferential depopulation of ground state sublevels 34 and 35 is provided, represents, in ruby, the result of linearly polarized light parallel to the optic axis impinging on the sample 20, with an external magnetic field parallel to the optic axis.

It will be understood that several different polarizations can be used for each absorption line or band, so that some choice in the sublevels depopulated can be obtained. The same type of polarization may, in depopulating the sublevels, cause transitions in differing proportions and rates to the two excited states.

For a more detailed understanding of photoluminescence, reference may be had to "Luminescence of Solids" by Leverenz, John Wiley and Sons, 1950, and to "Fluorescence and Phosphorescence" by Peter Pringsheim, Interscience Publishers, 1949.

Whereas several suitable materials have been mentioned as suitable for use at 18 and 20, and ruby has been described as particularly suitable for use, it should be understood that the invention is not limited to the materials mentioned. For the amplification of microwaves, the material must meet certain requirements including (a) the identity of the magnetic sublevels in both the ground and excited states must be maintained; (b) coherence effects must be eliminated and self-absorption effects reduced; and (c) the physical parameters of the system must satisfy certain boundary conditions involving the relationships between the light intensity, relaxation times and optical cross section, and it is assumed in the above description that these relationships have been met since they are relationships which would be apparent to one skilled in the optically pumped maser art. For the amplification of sub-millimeter or infrared radiation the above mentioned criterion (a) need not be satisfied as long as the frequency to be amplified is greater than the frequency width of the "pumping" line.

The first element of active material 18 may be thought of as a light concentrator for providing emission in the narrow bands 22 and 23, which emission after polarization at 19 is absorbed in the narrow bands 22' and 23' by the second element of active material 20.

As previously stated, where certain materials are employed, or certain frequencies are to be amplified, the means for setting up the external magnetic field 57, including elements 58 to 62 inclusive, may be dispensed with.

Figure 3:
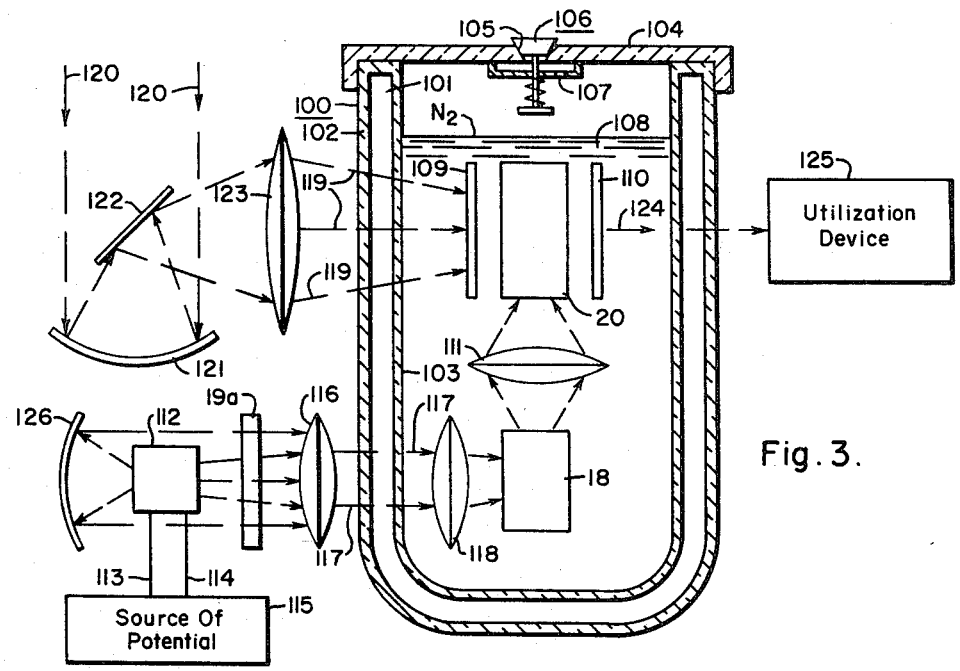
FIG. 3 is a view of apparatus especially suitable for amplifying infrared energy, according to the preferred embodiment of the invention.

Particular reference should be made now to FIG. 3 in which an embodiment of the invention especially suitable for amplifying electromagnetic wave energy in the light portion of the electromagnetic wave energy spectrum, including the optical portion and the infrared portion, is shown. The samples of active material 18 and 20 are shown mounted by any convenient means, not shown, inside a cryostat generally designated 100 having an evacuated area 101 between wall portions 102 and 103, the wall portions being composed of a material which is transparent or substantially transparent to light waves in the portion of the spectrum which it is desired to amplify, and also in the portion of the spectrum in which light energy is to be absorbed by element 18. The cryostat 100 has a cover portion 104 with an aperture 105 therein in which is disposed a spring loaded safety device 106 having a small bore 107 therein to permit the slow escape of gases from the inside of the cryostat. The cryostat is filled with liquid nitrogen or any other desired coolant 108 to a level which will at least cover the equipment disposed therein. If desired, means, not shown, may be provided for supercooling the coolant to avoid bubbling. It will be noted that the sample of active material 20 is enclosed between the two semi-transparent plates 109 and 110, that the sample of active material 18 is disposed beneath sample 20 and that radiative emission from the sample 18 is focused by lens 111 upon the second sample of active material 20.

Disposed outside of the cryostat 100 is a light source 112 connected by leads 113 and 114 to a source of energizing potential 115. The light source 112 has a reflector 126 disposed in predetermined position thereto and mounted by any convenient means, not shown. Light from the source 112 after passing through filter 19a, which may be dispensed with if desired, reaches a first lens 116 disposed outside of the cryostat by both direct paths and indirect paths after reflection from the reflector 126, light rays thereafter passing through the walls of the cryostat by paths indicated at 117 to a second lens 118; thence they are focused onto the sample 18 which becomes luminescent and emits radiation in a narrow waveband as previously explained. The light which it is desired to amplify impinges on the second sample of active material 20, or more precisely, on the semi-transparent plate 109, by paths represented by arrows 119. It should be understood that this light to be amplified may come from any convenient or desired source. By way of illustration the light to be amplified is shown as infrared radiation arriving by paths 120 from a distant source and impinging upon an antenna 121 whence they are refracted to a mirror 122 and are thence reflected by lens 123 to the aforementioned plate 109. The amplified light energy leaving the second sample 20 passes through the aforementioned semi-transparent plate 110 and by a path 124 passes through the walls of the cryostat to a utilization device indicated in block form at 125.

Figure 4:
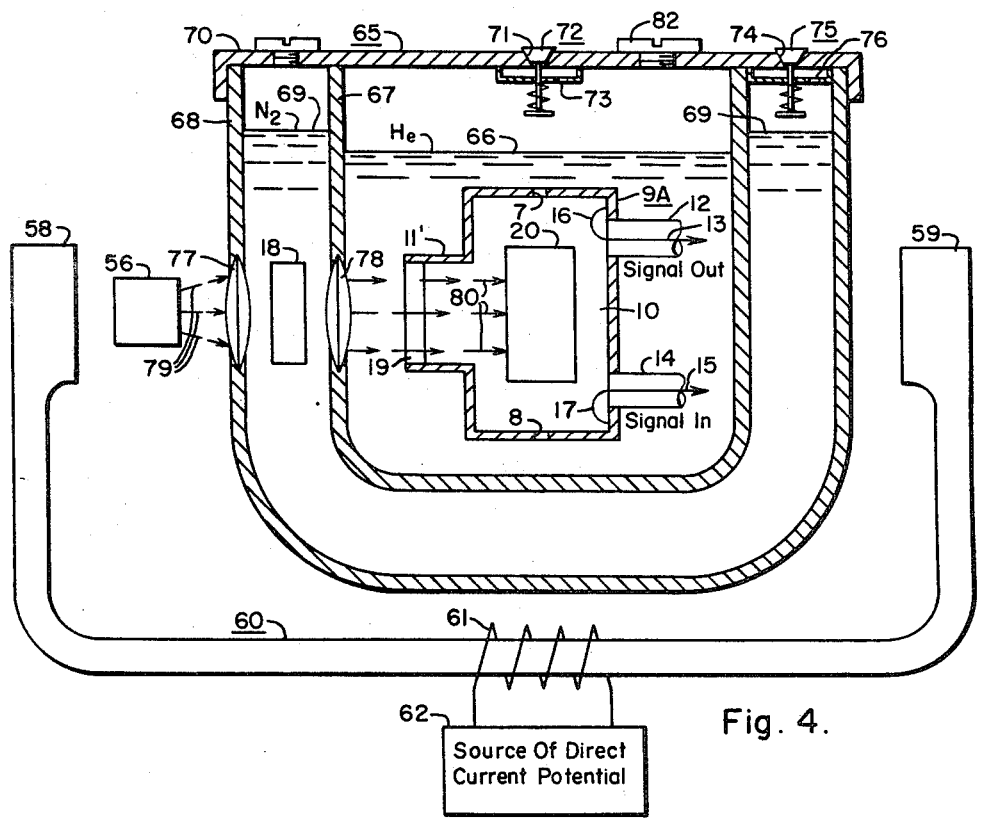
FIG. 4 is a view of apparatus especially suitable for amplifying microwave energy.

Particular reference should be made now to FIG. 4 which is a view of apparatus especially suitable for amplifying microwave energy. In FIG. 4 the resonant cavity generally designated 9A has means 12 for conducting amplified electromagnetic wave energy from the cavity and means 14 for conducting electromagnetic wave energy of microwave frequency into the cavity to be amplified. In the drawing of FIG. 4, 12 and 14 are shown as coaxial transmission lines having center conductors 13 and 15 respectively, and coupling loops 16 and 17 respectively, but it should be understood that waveguide means could be employed if desired for bringing radio frequency or microwave energy to and from the cavity 10. The cavity forming means 9A has small apertures 7 and 8 in the ends thereof and the entire cavity forming means is disposed inside a cryostat generally designated 65 and is mounted by any suitable means, not shown, in a volume of liquid helium 66. The cryostat 65 has inner and outer containers 67 and 68, respectively, separated from each other by a predetermined distance and the space between the containers 67 and 68 is filled with liquid nitrogen 69.

The cryostat generally designated 65 has a cover portion 70 with fluid inlet means 82 of any convenient type, the means shown being merely symbolical, and with a relatively large aperture 71 for a spring loaded safety device 72 having a small bore 73 therein, and the cover portion 70 has a smaller aperture 74 for a closure member or safety device 75 with a small bore 76 therein.

The aforementioned resonant chamber forming means 9A has a stub portion 11' in FIG. 4 in which is disposed light polarizing means 19 which may include if desired light filtering means.

The first element of active material 18 is shown mounted at a selected spot between the wall portions 67 and 68, where the element 18 will have a large portion of its entire surface in contact with liquid nitrogen and will be maintained at the temperature of liquid nitrogen, any suitable mounting means, not shown, being provided. Adjacent the element of active material 18 on either side thereof are lenses 77 and 78, which may be mounted in wall portions 68 and 67, respectively. A source of broad spectrum or white light previously described and designated 56 is disposed outside of the cryostat, and light from the source 56 by paths 79 reaches the first lens 77, from thence passes to the first sample of active material 18. Emission from sample 18 passes through lens 78 and by paths 80 through the polarizing element 19 and impinges upon the second element of active material 20. Means similar to that shown in connection with FIG. 1 is shown in FIG. 4 for setting up a steady state magnetic field of predetermined direction and magnitude on one or both of the samples 18 and 20, this means including the electromagnet generally designated 60 having pole pieces 58 and 59 with an energizing coil 61 connected to a source of direct current energizing potential 62.

Figure 5:
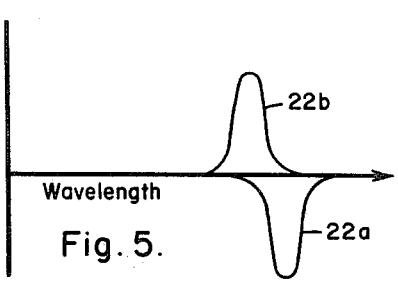
FIG. 5 is a graph illustrating the operation of the apparatus of FIG. 4.

Particular reference should be made now to FIG. 5, which shows on a greatly expanded scale the absorption and emission lines 22' and 22 of FIG. 2B, the absorption line of sample 20 being designated 22b in FIG. 5 and the emission line of sample 18 being designated 22a in FIG. 5. It will be noted that the absorption line 22b of sample 20 does not correspond exactly in wave length to the emission line 22a of sample 18. This results from the fact that the samples 18 and 20 are not at the same temperature. The sample 18, being immersed in a bath of liquid nitrogen, is at substantially the temperature of liquid nitrogen which may be on the order of 77° K., whereas sample 20 is immersed in liquid helium, the helium pouring into the cavity forming means 9A through the openings 7 and 8, so that the sample 20 is at a temperature of approximately 4° K. As a result of this, the emission and absorption lines do not correspond exactly in wavelength, but it will be seen from FIG. 5 that there is sufficient overlap of the lines along the wavelength coordinate so that a substantial amount of optical radiation from sample 18 of FIG. 4 is absorbed by sample 20.

The operation of the apparatus of FIG. 4 will be readily understood in view of the aforegoing description of the operation of the apparatus of FIG. 1 and need not be described in further detail.

If desired, any of the cavities of the several figures may be resonant at a number of frequencies to provide for simultaneous amplification of a number of signals, for, as previously stated, any radiative transition electron path between any two of the ground state sublevels may provide for amplification by stimulated emission of radiation.

The invention includes the use of the aforedescribed apparatus for the generation of oscillations by increasing the number of atoms in an emissive condition to the necessary value.

Whereas the invention has been shown and described with reference to elements 18 and 20 being of the same material elements of different material which have the necessary overlapping emission and absorption lines or bands could be employed.

Whereas the invention has been shown and described with respect to two elements of active material, three or more could be employed, with the emission from the first being absorbed by the second, and emission from the second being absorbed by the third.

Where light waves, for example, waves in the infrared portion of the spectrum are to be amplified, the light from element 18 need not be polarized and the polarizing means 19 may be dispensed with. Also the identity of the quantum number "m" need not be preserved in the ground or excited states. "Pumping" results by virtue of the separation of the lines or energy levels or sublevels.

Whereas the invention has been shown and described with respect to several embodiments thereof which give satisfactory results, it should be understood that changes may be made and equivalents substituted without departing from the spirit and scope of the invention.

I claim as my invention:

1. Solid state light source apparatus for exciting an active material having excited energy levels of electrons and suitable for use in masers and light amplifiers comprising, in combination, a first element of solid active material having a plurality of ground state sublevels of electron energy separated from each other by discrete amounts, said first element undergoing optical absorption when irradiated with light in a predetermined first wavelength band in the light energy spectrum, optical absorption in the first element resulting the movement of at least some of the electrons from ground state sublevels to excited energy levels and the creation of an excited stated in said first element, a lower ground state sublevel being depopulated by the movement of electrons to excited energy levels at a greater rate than an upper ground state sublevel, electrons thereafter moving from the excited energy levels to the plurality of ground state sublevels, some of the electrons in an upper ground state sublevel thereafter moving by radiative transition to a lower ground state sublevel and being adapted while so moving to give up energy to an electromagnetic wave of predetermined frequency impinging on the first element, a source of broad spectrum light, and a light concentrator including a second element of the same solid active material interposed between the source of light and said first element and having broad spectrum light impinging thereon, said second element having optical absorption of light over a second wavelength band broad relative to said first wavelength band and lying outside of the first wavelength band, the optical absorption in said second element resulting in electrons moving to excited energy levels, said electrons of said second element thereafter falling back by radiationless decay to a metastable luminescent state in said second element, said electrons thereafter returning from the luminescent state to the ground state and emitting optical energy in said first wavelength band, said last-named optical energy passing to said first element and causing an excited state in the first element of active material.

2. Solid state apparatus for providing a source of electromagnetic wave energy for use in electromagnetic wave amplifiers comprising, a sample of solid state active material having at least two separate regions of discrete energy levels, one of said regions including ground states and the other region including excited states, and optical means for preferentially depopulating one of the lower ground states and simultaneously pumping electrons from said ground states to said region of excited states to thereby provide a negative spin temperature between at least two ground states corresponding to a selected frequency.

3. Stimulated emission of radiation apparatus comprising a body of solid negative temperature medium, means for coupling optical photon energy into said medium for exciting electrons of said medium into energy states above the ground state, means operatively associated with said medium for confining and reflecting at least a portion of the electromagnetic wave energy emanating from said medium to provide regenerative coupling between the transitions of the excited electrons and said electromagnetic wave energy, and means for extracting electromagnetic wave energy from said apparatus.

4. In stimulated emission of radiation apparatus a negative temperature medium constituting a quantum system comprising an ensemble of atoms, ions, or molecules some of which have a broad band of energy levels corresponding to a broad band of absorption lines and other energy levels corresponding to sharp luminescent emission lines, the upper energy levels of said band being above the upper levels of said sharp lines, the levels of said broad band being coupled by fast non-radiating transitions to the upper energy levels of said emission lines, and a source of broad band optical energy for irradiating said medium body to excite said quantum system into said broad band.

5. In the method of producing state preparation in a negative temperature medium constituting a quantum system comprising an ensemble of atoms, ions, or molecules, some of which have a broad band of energy levels corresponding to a broad band of absorption lines and other energy levels corresponding to sharp luminescent emission lines, the upper energy levels of said band being above the upper levels of said sharp lines and the levels of said broad band being coupled by fast non-radiating transitions to the upper energy levels of said emission lines, the step of irradiating said medium with broad band optical energy for pumping said medium.

6. Stimulated emission of radiation apparatus, including as a negative temperature medium a body of ruby and a source of broad band optical energy for irradiating said body.

7. In combination in stimulated emission of radiation apparatus, a solid state medium constituting a quantum system comprising an ensemble of atoms, ions, or molecules, some of which have excited energy levels corresponding to relatively sharp absorption and emission lines, a source of optical energy for pumping said quantum system into one or more of the upper levels corresponding to said sharp lines to produce state preparation in at least one of the lower of the sublevels in the ground state.

8. In combination in stimulated emission of radiation apparatus, a solid state medium constituting a quantum system comprising an ensemble of atoms, ions, or molecules, some of which have degenerate ground state levels and other energy levels which correspond to relatively sharp absorption and emission lines, means for splitting the ground states of said system, a source of optical photon energy for pumping said quantum system into one or more of the energy levels corresponding to said sharp lines to produce state preparation in a pair of said ground state sublevels.

9. In stimulated emission of radiation apparatus, a solid state medium constituting a quantum system comprising an ensemble of atoms, ions, or molecules, some of which have a broad band of energy levels corresponding to a broad band of absorption lines and other energy levels corresponding to sharp luminescent emission lines, the upper energy levels of said band being above the upper levels of said sharp lines and the levels of said broad band being coupled by fast non-radiating transitions to energy levels of said emission lines, and a source of broad band optical energy for pumping said quantum system into said broad band of energy levels, and means for utilizing the electromagnetic wave energy resulting from the downward radiating transitions of said quantum system.

10. Stimulated emission of radiation apparatus comprising a solid state medium constituting a quantum system comprising an ensemble of atoms, ions, or molecules, some of which have an energy absorption band corresponding to higher energy levels and a narrow emission line corresponding to lower energy levels coupled to said higher energy levels so that a portion of the downward transitions to the radiating state occur without photon emission, and a source of optical photon energy pumping means for exciting said quantum system and having its spectrum extending across said absorption band but having substantially no photon energy within said sharp emission line.

11. In stimulated emission of radiation apparatus, an electromagnetic wave cavity, a body of solid state negative temperature medium constituting a quantum system comprising an ensemble of atoms, ions, or molecules in said cavity, a source of broad band light for exciting atoms, ions, or molecules of said quantum system to levels above their metastable states, said cavity being resonant at a frequency corresponding to the transition frequency between a pair of energy levels of said quantum system, neither of which is above said metastable state and one of which is below said metastable state.

12. In combination in stimulated emission of radiation apparatus, a solid state medium constituting a quantum system comprising an ensemble of atoms, ions, or molecules, some of which have relatively sharp absorption and emission lines, a source of optical photon energy for pumping said quantum system into selected energy levels corresponding to certain sharp absorption lines, said latter means including light polarizing means and means for immersing said medium in a magnetic field whereby the energy in the pumping source will selectively stimulate upward transitions thereby enabling state preparation in at least one of the sublevels of the energy levels corresponding to a sharp absorption line.

13. In combination in stimulated emission of radiation apparatus, a first quantum system comprising an ensemble of atoms, ions, or molecules, some of which have a broad band of absorption states and sharp luminescent emission states, said band of absorption states being above and coupled by fast non-radiating transitions to said sharp emission states, a source of broad band optical energy for pumping said quantum system into said broad band of states from which said atoms, ions, or molecules drop by radiationless transitions to said sharp emission states, a second quantum system, some of the atoms, ions, or molecules of which have sharp absorption lines, and at least one of which substantially coincides with an emission line of said first quantum system, means for immersing said second quantum system in a magnetic field and means for polarizing the monochromatic radiation from said first quantum system for producing selective depopulation of energy levels below the sharp emission states of said second quantum system.

14. In combination in stimulated emission of radiation apparatus, a quantum system comprising an ensemble of atoms, ions, or molecules, some of which have a broad band of absorption states and sharp absorption and luminescent emission states, said band of absorption states being above and coupled by fast non-radiating transistions to said sharp emission states, a source of broad band optical photon energy having substantially no pumping energy at said emission frequencies for pumping said quantum system into said broad band of states, means for transferring energy from excited atoms, ions, or molecules in said sharp emission states to other atoms, ions, or molecules radiatively coupled to a lower energy level.

15. In combination in stimulated emission of radiation apparatus, a solid state negative temperature medium constituting a quantum system comprising an ensemble of atoms, ions, or molecules, certain of which have a broad band of energy levels corresponding to a broad band of absorption lines and other levels corresponding to sharp luminescent emission lines, the upper energy levels of said band of absorption lines being above and coupled by fast non-radiating transitions to the upper levels of said emission lines, a source of broad band optical energy for pumping said quantum system into said broad band of levels and means for coupling the electromagnetic wave energy radiation output resulting from downward transitions from the sharp luminescent lines with electromagnetic wave energy to be amplified.

References Cited

FOREIGN PATENTS 953,721  4/1964  Great Britain.

OTHER REFERENCES

"Quantum Electronics," edited by Townes, Columbia University Press, New York 1960, article by Brossel on pages 81–91.

"Microwave Solid-State Masers," by Siegman, McGraw-Hill, New York, 1964, pages 250, 562 and 563.

ROY LAKE, *Primary Examiner.*

D. R. HOSTETTER, *Assistant Examiner.*

Notice of Adverse Decision In Interference

In Interference No. 97,070 involving Patent No. 3,403,349, I. Wieder, OPTICALLY PUMPED MASER AND SOLID STATE LIGHT SOURCE FOR USE THEREIN, final judgment adverse to the patentee was rendered Aug. 31, 1972, as to claims 2, 11, 14 and 15.

[*Official Gazette January 16, 1973.*]